(12) United States Patent
Allen-Ware et al.

(10) Patent No.: US 9,547,587 B2
(45) Date of Patent: Jan. 17, 2017

(54) DYNAMIC POWER AND THERMAL CAPPING FOR FLASH STORAGE

(71) Applicant: International Business Machines Corporation, Armonk, NY (US)

(72) Inventors: Malcolm S. Allen-Ware, Austin, TX (US); Shawn P. Authement, Round Rock, TX (US); Charles R. Lefurgy, Austin, TX (US); Karthick Rajamani, Austin, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 14/286,148

(22) Filed: May 23, 2014

(65) Prior Publication Data
US 2015/0338910 A1 Nov. 26, 2015

(51) Int. Cl.
*G06F 1/32* (2006.01)
*G06F 12/02* (2006.01)
*G06F 1/20* (2006.01)

(52) U.S. Cl.
CPC ........... *G06F 12/0246* (2013.01); *G06F 1/206* (2013.01); *G06F 1/3206* (2013.01); *G06F 1/3225* (2013.01); *G06F 12/02* (2013.01); *G06F 2212/7206* (2013.01)

(58) Field of Classification Search
None
See application file for complete search history.

(56) References Cited

U.S. PATENT DOCUMENTS

| 6,415,388 | B1 | 7/2002 | Browning et al. |
| 7,337,339 | B1 | 2/2008 | Choquette et al. |
| 7,567,462 | B2 | 7/2009 | Yamada |
| 7,742,353 | B2 | 6/2010 | Chen et al. |
| 8,072,704 | B1 | 12/2011 | Goldberg et al. |
| 8,145,828 | B2 | 3/2012 | Ouchi |
| 8,583,947 | B2 | 11/2013 | Byom et al. |

(Continued)

*Primary Examiner* — Mark Connolly
*Assistant Examiner* — Kevin Stewart
(74) *Attorney, Agent, or Firm* — Francis Lammes; Stephen J. Walder, Jr.; William J. Stock (57) ABSTRACT

A mechanism is provided for dynamic power and thermal capping in a flash storage system. A set of measurement values are received for the flash storage system, the set of measurement values comprising one or more of a set of current (I) measurement values, a set of voltage (V) measurement values, or a set of temperature (T) measurement values. An average current ($I_{avg}$) value from the set of current (I) measurements and, responsive to the average current ($I_{avg}$) value being greater than a predetermined maximum current ($I_{max}$) value, a determination is made as to whether a rate at which erase operations are performed for the flash storage system is greater than a predetermined minimum erase rate. Responsive to the rate at which erase operations are performed for the flash storage system being greater than the predetermined minimum erase rate, the rate at which erase operations are performed for the flash storage system are decreased by a predetermined value.

17 Claims, 3 Drawing Sheets

(56) References Cited

U.S. PATENT DOCUMENTS

| | | | |
|---|---|---|---|
| 8,627,124 B2 | 1/2014 | Carter et al. | |
| 8,751,836 B1 * | 6/2014 | Piszczek | G06F 1/3268 |
| | | | 713/300 |
| 2005/0210304 A1 | 9/2005 | Hartung et al. | |
| 2006/0226243 A1 * | 10/2006 | Dariel | G06K 7/0008 |
| | | | 235/492 |
| 2007/0049133 A1 * | 3/2007 | Conroy | G06F 1/26 |
| | | | 439/894 |
| 2008/0178019 A1 * | 7/2008 | McGrane | G06F 1/26 |
| | | | 713/320 |
| 2010/0292854 A1 | 11/2010 | Burg et al. | |
| 2010/0332871 A1 | 12/2010 | Allalouf et al. | |
| 2012/0047320 A1 | 2/2012 | Yoo et al. | |
| 2012/0210149 A1 | 8/2012 | Carter et al. | |
| 2012/0331282 A1 | 12/2012 | Yurzola et al. | |
| 2013/0050890 A1 * | 2/2013 | Rozman | H03K 17/082 |
| | | | 361/90 |
| 2013/0290611 A1 | 10/2013 | Biederman et al. | |
| 2014/0181620 A1 * | 6/2014 | Kotzur | G06F 11/1068 |
| | | | 714/764 |

\* cited by examiner

FIG. 3

DYNAMIC POWER AND THERMAL CAPPING FOR FLASH STORAGE

BACKGROUND

The present application relates generally to an improved data processing apparatus and method and more specifically to mechanisms for dynamic power and thermal capping in flash storage.

Flash storage is any data repository or system that uses flash memory. The size and complexity of such systems ranges from portable Universal Serial Bus (USB) drives to enterprise-class array-based memory systems. Flash storage uses electricity and has no mechanical parts. Flash storage typically consumes only 20% of the power of traditional mechanical hard drives and reads more than one hundred times faster than traditional mechanical hard drives. Most flash storage systems are composed of a memory unit and an access controller. The memory unit is used to store data. The access controller manages and controls access to the storage space on the memory unit. Data is written onto NAND flash memory, NOR flash memory, or a combination of the two.

SUMMARY

In one illustrative embodiment, a method, in a data processing system, is provided for dynamic power and thermal capping in a flash storage system. The illustrative embodiment receives a set of measurement values for the flash storage system. In the illustrative embodiments, the set of measurement values comprise one or more of a set of current (I) measurement values, a set of voltage (V) measurement values, or a set of temperature (T) measurement values. The illustrative embodiment determines an average current ($I_{avg}$) value from the set of current (I) measurements. The illustrative embodiment determines whether a rate at which erase operations are performed for the flash storage system is greater than a predetermined minimum erase rate in response to the average current ($I_{avg}$) value being greater than a predetermined maximum current ($I_{max}$) value. The illustrative embodiment decreases the rate at which erase operations are performed for the flash storage system by a predetermined value in response to the rate at which erase operations are performed for the flash storage system being greater than the predetermined minimum erase rate.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, a flash storage system is any data repository or system that uses flash memory. Flash storage systems may comprise flash memory that is a fixed part of a data processing system such as flash memory as part of a mother board, a daughter board, or the like, as well as flash memory that may be dynamically added to the data processing system, such as though Peripheral Component Interconnect (PCI) coupled flash cards. Regardless of where the flash memory resides within the data processing system, the flash memory may operate within a fixed power envelope or budget. That is, with data processing systems being more power efficient, each portion of the data processing system may have an assigned power budget, which includes a power budget for the flash storage system. However, currently there is no dynamic measurement and feedback limiting mechanism that keeps flash storage systems operating within an associated power budget and, currently, flash storage systems often exceed their assigned power budget. That is, currently there is no power capping mechanism applied to a flash storage system through a measurement and feedback system that manipulates erase operations as a primary means to alter the power drawn by the storage flash system.

That is, flash storage systems operate with a set of operations, such as erase, write, and read. In flash storage systems, erase operations are a means by which one or more bits of one or more of the subcomponents on the flash device, such as NANDs, NORs, or a combination of the two, are initialized to a first state, such as a "1", so that, in a subsequent write operation, a flash controller merely has to change only those bits that need to be in a second state, such as "0", from the first state to the second state, thereby drawing less power. Therefore, when the erase operation is executed to a flash device within the flash storage system, one or more bits of one or more of the subcomponents on the flash device, such as NANDs, NORs, or a combination of the two, are placed into a first state, which may take several milliseconds. Thus, the execution of the erase operation to the subcomponents of flash device draws the most power of any of the operations executed by the flash storage system. Furthermore, current erase operations to the subcomponents on the flash device operate at a static rate so that portions of the flash memory are ready for subsequent write operations. Again, when a subsequent write operation is executed, only the specific bits that need to be changed to a second state are changed to the second state. Thus, a flash storage system manages work efficiently in write operation by only changing the state of those bits that need to be changed and, therefore, draw less power. While the erase operation, write operation, and even the read operation alone may not exceed the associated power budget for the portion of the flash storage system, a combination of the erase operation with either a write operation or a read operation often does exceed the associated power budget. However, as stated previously, currently there is no mechanism to dynamically measure the power being utilized by the various devices of the flash storage system and limit the power being utilized in order to keep the flash storage system operating within an associated power budget.

Thus, the illustrative embodiments provide for a dynamic power and thermal capping of flash storage systems. The mechanisms provide for dynamic power/performance optimization of the flash subsystem using a measurement and feedback system involving power and/or thermal measurements and control of flash knobs to adjust power draw limits dynamically. In the illustrative embodiments, using measured power usage as well as a measured temperature for each portion of the flash storage system, when a power cap and/or temperature cap is reached, the mechanisms dynamically adjust the erase rate to respond first to power/thermal capping. Therefore, rather than erase operations occurring at a constant rate, the mechanisms control the erase operations scheduling across the devices within the flash storage system. If the erase rate has been adjusted such that a minimum erase rate is met, then the mechanism adjusts one or more of read rate operations or write rate operations to meet the power budget. In the illustrative embodiments, the rate at which writes are performed are lowered before the rate at which read operations are performed, because write operations utilize more power than read operations, since in write operations the state of one or more bits is actually being changed.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure, or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
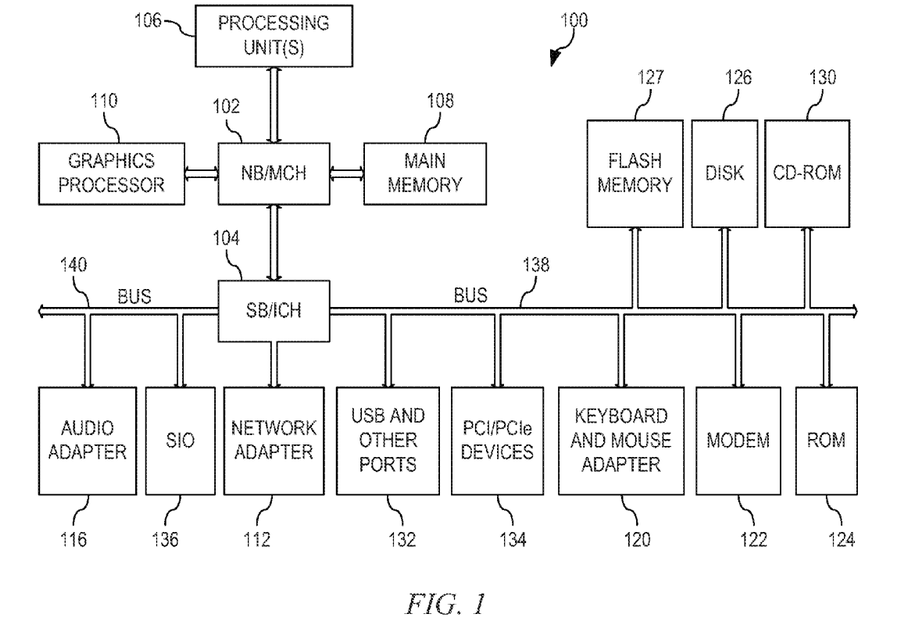
FIG. 1 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD)) 126, flash memory 127, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, white PCIe does not. ROM 124 may be, for example, a flash basic input/output system (BIOS).

HDD 126, flash memory 127, and CD-ROM drive 130 connect to SB/ICH 104 through bus 138. HDD 126 and CD-ROM drive 130 may use, for example, an integrated drive electronics (IDE) or serial advanced technology attachment (SATA) interface. Flash memory 127 may use, for example, a Common Flash memory Interface (CFI), Open NAND Flash Interface (ONFI), Serial Peripheral interface (SPI), or the like. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System P® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, flash memory 127, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Again, the illustrative embodiments provide for a dynamic power and thermal capping in flash storage systems. At regular intervals (t), measurements of current (I), voltage (V), and temperature (T) are received associated with the flash storage system. A flash storage system, for example, may be comprised of some flash memory on the mother board, flash memory on the daughter board, and any flash controllers, Dynamic Random Access Memory (DRAM), and processing elements to manage this flash memory. Any number of flash storage systems, each managed independently, may be coupled to the data processing system via a PCI/PCIe interface. Each flash storage system has its own control system that comprises measurements of current (I), voltage (V), and temperature (T) associated with the entire flash storage system. Within an enclosure there may be one or more independent flash storage systems. Utilizing these measurements, one or more of the following rates may be adjusted: the rate at which erase operations are performed, the rate at which write operations are performed, or the rate at which read operations are performed. The rates may be increased or decreased for the flash storage system in order to stay within an associated power budget allocated to each individual flash storage system.

Figure 2:
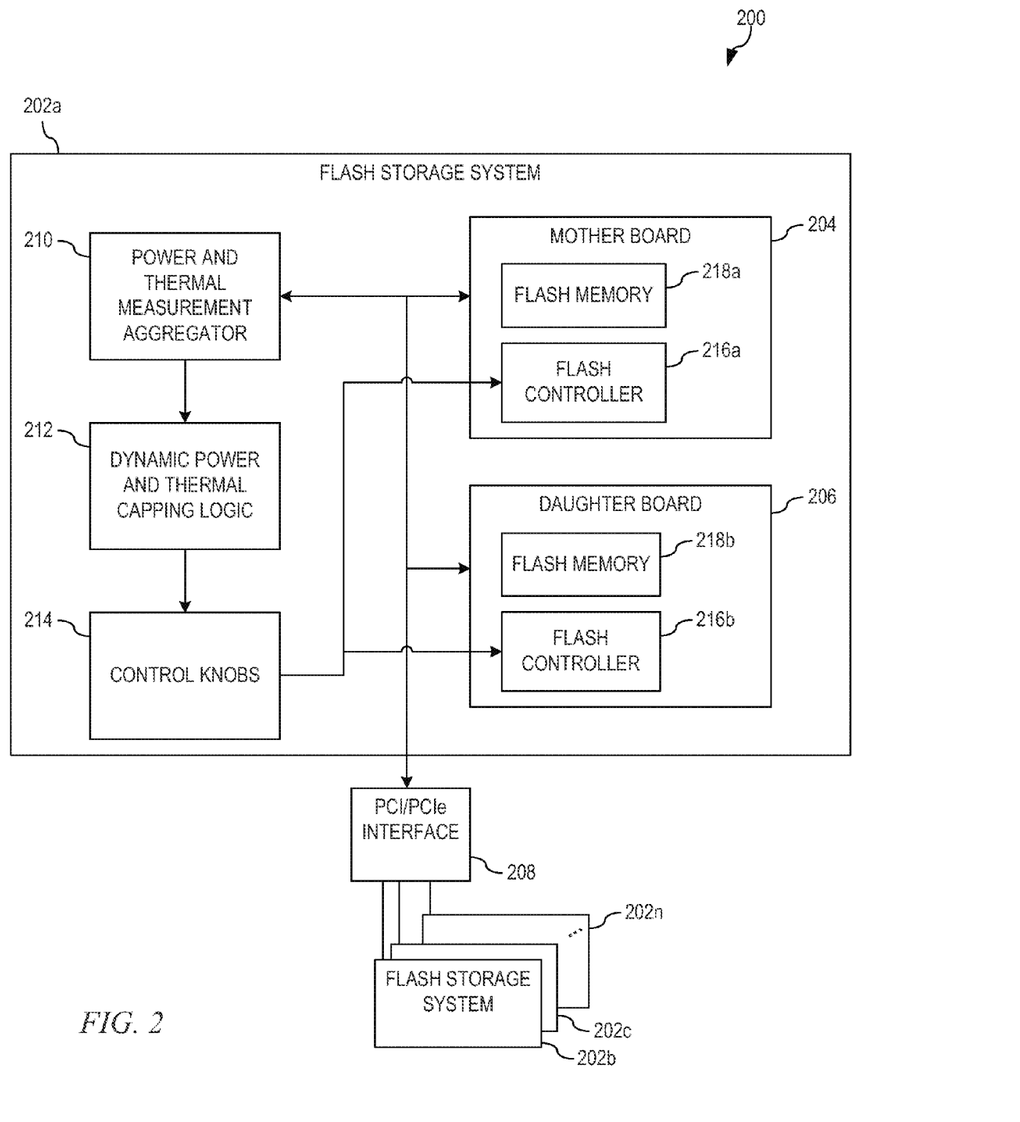
FIG. 2 depicts a dynamic power and thermal capping mechanism for a flash storage system in accordance with an illustrative embodiment.

FIG. 2 depicts a dynamic power and thermal capping mechanism for a flash storage system in accordance with an illustrative embodiment. Enclosure 200, which may be referred to as a data processing system, comprises flash storage systems 202a, 202b, 202c, . . . , 202n. Each flash storage system comprises a motherboard 204 and an optional daughterboard 206. All the flash storage systems are coupled within enclosure 200 through a PCI/PCIe interface 208. Each of flash storage systems 202a-202n comprises power and thermal measurement aggregator 210, dynamic power and thermal capping logic 212, and control knobs 214 as well as one or more flash controllers associated with groups of flash memory, such as flash controller 216a and 216b illustrated on motherboard 204 and daughterboard 206, respectively. While only one flash controller is shown as being associated with each flash memory, the illustrative embodiments recognize that one or more flash controllers may be associated with flash memory. That is, the flash memory may be of a size that requires more than one flash controller to perform the various read, write, and erase operations of the flash storage system.

In accordance with the illustrative embodiments, dynamic power and thermal capping logic 212 may implement dynamic power and thermal capping to manipulate erase operations within the flash storage system as part of an ongoing garbage collection process, as part of a defragmentation process, as part of a primary initialization of one or more portions of flash memory, or the like. For example, garbage collection is the means by which the firmware takes old, invalid data and recovers the space for use by new, valid data. As a further example, defragmentation is the means by which firmware takes fragmented data (i.e., data in flash blocks whereby some of the data is valid and some of the data is invalid) and moves valid data into freshly erased blocks and then marks all the fragmented data as invalid so that the block becomes invalid and can be subsequently erased. In either of these events, once old, invalid data blocks have been identified through the garbage collection process or after a move operation associated with a defragmentation process, a flash controller, such as flash controller 216a, receives an identification of these old, invalid data blocks and implements an erase operation on the old, invalid data blocks.

Again, in flash storage systems such as flash storage system 202a-202n, erase operations are a means by which one or more of the bits of one or more of the subcomponents on the flash device, such as NANDs, NORs, or a combination of the two, are initialized to a first state, so that, in a subsequent write operation, a flash controller merely has to change only those bits that need to be in a second state from the first state to the second state, thereby drawing less power. Once the old, invalid data blocks have been erased, the flash controller returns an indication of those erased blocks into a Free Block pool. Thus, when a user wants to write data, the flash controller identifies a data block from the Free Block pool.

However, since the execution of the erase operation to the subcomponents of flash storage system draws the most power of any of the operations executed by the flash storage system and current erase operations to the subcomponents on the flash storage system operate at a static rate so that portions of the flash memory are ready for subsequent write operations, any combination of erase operations, write operations, and even the read operations may cause an associated power budget for the portion of the flash storage system to be exceeded. Furthermore, currently there is no mechanism to dynamically measure the power being utilized by the various devices of the flash storage system and limit the power being utilized in order to keep the flash storage system operating within an associated power budget.

Therefore, at regular intervals (t), each power and thermal measurement aggregator 210 in its respective flash storage system obtains current (I), voltage (V), and temperature (T) measurements associated with the entire flash storage system. The following is directed to flash storage system 202a although the same process is implemented on each of flash storage systems 202a-202n. That is, each flash storage system 202a-202n acts independently with each having a power, current, and thermal cap that must be adhered to. Therefore, with regard to flash storage system 202a, power and thermal measurement aggregator 210 obtains current (I), voltage (V), and temperature (T) measurements associated with the entire flash storage system. Power and thermal measurement aggregator 210 may obtain a set of temperature (T) measurements via thermal sensors either directly on the flash memory devices 218a-218b, flash storage controllers 216a-216b, DRAM, or other processing elements comprising the flash storage system. Power and thermal measurement aggregator 210 may obtain the current (I) and voltage (V) measurements from individual current and voltage sensors directly coupled to flash storage system 202a or using an industry standard sensor that senses both the current and the voltage and is directly measuring all the input currents and the input voltages going to the entire flash storage system 202a. Additionally, since some of the devices on the flash storage system may be powered by different voltages, such as 12 Volts and 3.3 Volts, power and thermal measurement aggregator 210 may obtain a voltage (V) measurement and a current (I) measurement for each of the voltage rails. The preferred embodiment is to sense all the input current and input voltage going to the entire flash storage system 202a.

Since the sampling rates of each of the voltage sensors, current sensors, voltage and current sensors, and thermal sensors may be 1 kHz or faster, which may lead to 1 millisecond samples, in order to reduce noise, power and thermal measurement aggregator 210 may only obtain the measurements from the sensors at regular intervals rather than at the sampling rate, for example, once every 8 milliseconds. In the illustrative embodiments, values for the entire flash storage system 202a are obtained every 1 millisecond, Power is formed (I*V), and then an 8 millisecond average is formed by summing 8 power samples and dividing by 8. Alternatively, power and thermal measurement aggregator 210 will average the 1 millisecond samples and use an average current ($I_{avg}$) value and an average voltage ($V_{avg}$) value to calculate the power (P or $P_T$) values.

Power and thermal measurement aggregator 210 may obtain the power (P) of the entire flash storage system 202a by calculating a power (P) value by obtaining the product of the average current ($I_{avg}$) value and the average voltage ($V_{avg}$) value: $P=V_{avg}*I_{avg}$. If a flash storage system has more than one supplied voltage, then power and thermal measurement aggregator 210 calculates the individual power values, such as $P_1=V_{avg1}*I_{avg1}$, $P_2=V_{avg2}*I_{avg2}$, . . . , $P_n=V_{avgn}*I_{avgn}$, then sums the power values together, $P_T=P_1+P_2+\ldots+P_n$, to obtain a total power ($P_T$) value. With the various average current ($I_{avg}$) values, temperature (T) values, power (P or $P_T$) values determined, dynamic power and thermal capping logic 212 determines whether the average current ($I_{avg}$) value associated with that flash storage system is greater than a predetermined maximum current ($I_{max}$) value. If dynamic power and thermal capping logic 212 determines that the average current ($I_{avg}$) value associated with that flash storage system is greater than a predetermined maximum current ($I_{max}$) value, then dynamic power and thermal capping logic 212 determines whether the rate at which erase operations are performed for the flash storage system is greater than a predetermined minimum erase rate. If dynamic power and thermal capping logic 212 determines that the rate at which erase operations are performed for the flash storage system is greater than a predetermined minimum erase rate, then dynamic power and thermal capping logic 212 decreases the rate at which erase operations are performed for the flash storage system by a predetermined value via control knobs 214.

If dynamic power and thermal capping logic 212 determines that the rate at which erase operations are performed for the flash storage system is equal to the predetermined minimum erase rate, dynamic power and thermal capping logic 212 determines whether the rate at which write operations are performed for the flash storage system is greater than a predetermined minimum write rate. If dynamic power and thermal capping logic 212 determines that the rate at which write operations are performed for the flash storage system is greater than a predetermined minimum write rate, then dynamic power and thermal capping logic 212 decreases the rate at which write operations are performed for the flash storage system by a predetermined value via control knobs 214.

If dynamic power and thermal capping logic 212 determines that the rate at which write operations are performed for the flash storage system is equal to the predetermined minimum write rate, dynamic power and thermal capping logic 212 determines whether the rate at which read operations are performed for the flash storage system is greater than a predetermined minimum read rate. If dynamic power and thermal capping logic 212 determines that the rate at which read operations are performed for the flash storage system is greater than a predetermined minimum read rate, then dynamic power and thermal capping logic 212 decreases the rate at which read operations are performed for the flash memory by a predetermined value via control knobs 214. If dynamic power and thermal capping logic 212 determines that the rate at which read operations are performed for the flash storage system is equal to the predetermined minimum read rate, dynamic power and thermal capping logic 212 sends an error to an administrator indicating that all dynamic power and thermal capping changes have been made and manual intervention is required.

Going back to the initial determination as to whether the average current ($I_{avg}$) value associated with the flash storage system is greater than a predetermined maximum current ($I_{max}$) value, if dynamic power and thermal capping logic 212 determines that the average current ($I_{avg}$) value associated with the flash storage system fails to be greater than a predetermined maximum current ($I_{max}$) value, then dynamic power and thermal capping logic 212 determines whether the power (P or $P_T$) value associated with the flash storage system is greater than a predetermined maximum power ($P_{max}$) value. If dynamic power and thermal capping logic 212 determines that the power (P or $P_T$) value associated with the flash storage system is greater than the predetermined maximum power ($P_{max}$) value, then dynamic power and thermal capping logic 212 proceeds with the checks and decreases as described before.

If dynamic power and thermal capping logic 212 determines that the power (P or $P_T$) value associated with the flash storage system fails to be greater than the predetermined maximum power ($P_{max}$) value, dynamic power and thermal capping logic 212 determines a maximum temperature ($Td_{max}$) value of all the device temperature (Td) values obtained for the flash storage system. At this point, dynamic power and thermal capping logic 212 determines whether the $Td_{max}$ value is greater than a predetermined maximum temperature ($T_{max}$) value. If dynamic power and thermal capping logic 212 determines that the $Td_{max}$ value is greater than the $T_{max}$ value, then dynamic power and thermal capping logic 12 proceeds with the checks and decreases as described before.

If dynamic power and thermal capping logic 212 determines that the $Td_{max}$ value fails to be greater than the $T_{max}$ value, dynamic power and thermal capping logic 212 reverses the process by determining whether the rate at which read operations are performed for the flash storage system is at a maximum read rate. If dynamic power and thermal capping logic 212 determines that the rate at which read operations are performed for the flash storage system is not at the maximum read rate, then dynamic power and thermal capping logic 212 increases the rate at which read operations are performed for the flash storage system by a predetermined value via control knobs 214. If dynamic power and thermal capping logic 212 determines that the rate at which read operations are performed for the flash storage system is at the maximum read rate, then dynamic power and thermal capping logic 212 determines whether the rate at which write operations are performed for the flash storage system is at a maximum write rate. If dynamic power and thermal capping logic 212 determines that the rate at which write operations are performed for the flash storage system is not at the maximum write rate, then dynamic power and thermal capping logic 212 increases the rate at which write operations are performed for the flash storage system by a predetermined value via control knobs 214.

If dynamic power and thermal capping logic 212 determines that the rate at which write operations are performed for the flash storage system is at the maximum write rate, then dynamic power and thermal capping logic 212 determines whether the rate at which erase operations are performed for the flash storage system is at a maximum erase rate. If dynamic power and thermal capping logic 212 determines that the rate at which erase operations are performed for the flash storage system is not at the maximum erase rate, then dynamic power and thermal capping logic 212 increases the rate at which erase operations are performed for the flash storage system by a predetermined value via control knobs 214. If dynamic power and thermal capping logic 212 determines that the rate at which erase operations are performed for the flash storage system is at the maximum erase rate, then dynamic power and thermal capping logic 212 simply waits for the next interval.

While the above has described the control of the rate at which the erase, write and read operations are performed via flash controllers 216a-216b, each of flash controllers 216a-216b may also be controlled via control knobs 214 such that a frequency and/or voltage of the flash controllers 216a-216b may be dynamically adjusted, resulting in more dramatic swings in power and/or temperature. That is, when power reaches the limit $P_{max}$ of the flash storage system and/or the maximum temperature of the devices $Td_{max}$ in the flash storage system reaches $T_{max}$, rate control may be obtained in a more power efficient manner by lowering the frequency and/or power more quickly with less impact on the actual rate and still achieving a target power or thermal limit thereby allowing for improved operations per watt when the maximum rates of operations are not currently selected.

In accordance with the illustrative embodiments, the predetermined minimum erase rate, the predetermined minimum write rate, and the predetermined minimum read rate are set to values in order to meet a requested performance. However, as performance demands change, the predetermined minimum erase rate, the predetermined minimum write rate, and the predetermined minimum read rate may be changed to meet the new performance requirements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, hut is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
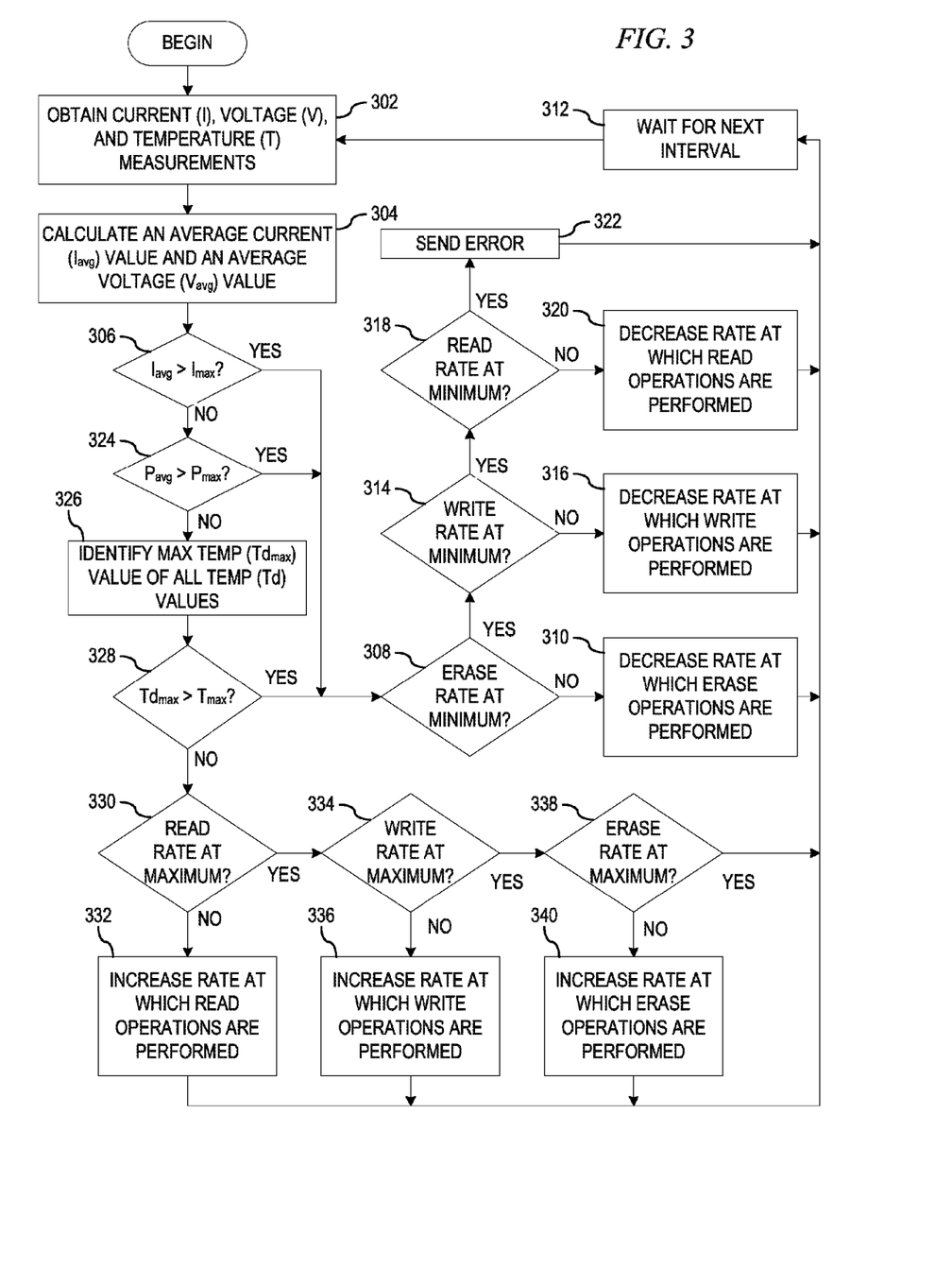
FIG. 3 depicts a flowchart of an exemplary operation performed by a dynamic power and thermal capping mechanism for flash storage systems in accordance with an illustrative embodiment.

FIG. 3 depicts a flowchart of an exemplary operation performed by a dynamic power and thermal capping mechanism for flash storage systems in accordance with an illustrative embodiment. The following operations are performed for each flash storage system in a set of flash storage system in an enclosure. Thus, the flowchart is for a single flash storage system.

As the operation begins, the dynamic power and thermal capping mechanism obtains current (I), voltage (V), and temperature (T) measurements associated with the flash storage system (step 302). If more than one measurement for each of the current (I) and voltage (V) are received for the current interval, the dynamic power and thermal capping mechanism calculates an average current ($I_{avg}$) value and an average voltage ($V_{avg}$) value (step 304). Using the determined average current (I) value and the determined average voltage ($V_{avg}$) value, the dynamic power and thermal capping mechanism calculates power (P or $P_T$) value. If the flash storage system has only one supplied voltage, the dynamic power and thermal capping mechanism calculates a power (P) value: $P=V_{avg}*I_{avg}$. If the flash storage system has more than one supplied voltage, the dynamic power and thermal capping mechanism calculates individual power values, such as $P_1=V_{avg1}*I_{avg1}$, $P_2=V_{avg2}*I_{avg2}$, . . . , $P_n=V_{avgn}*I_{avgn}$, then sums the power values together, $P_T=P_1+P_2+ \ldots +P_n$, to obtain a total power ($P_T$) value.

The dynamic power and thermal capping mechanism then determines whether the average current ($I_{avg}$) value associated with the flash storage system is greater than a predetermined maximum current ($I_{max}$) value (step 306). If at step 306 the dynamic power and thermal capping mechanism determines that the average current ($I_{avg}$) value associated with that flash storage system is greater than a predetermined maximum current ($I_{max}$) value, the dynamic power and thermal capping mechanism determines whether the rate at which erase operations are performed for the flash storage system is greater than a predetermined minimum erase rate (step 308). If at step 308 the dynamic power and thermal capping mechanism determines that the rate at which erase operations are performed for the flash storage system is greater than a predetermined minimum erase rate, the dynamic power and thermal capping mechanism decreases the rate at which erase operations are performed for the flash storage system by a predetermined value (step 310). The dynamic power and thermal capping mechanism then waits for the next interval (step 312) with the operation proceeding to step 302 thereafter.

If at step 308 the dynamic power and thermal capping mechanism determines that the rate at which erase operations are performed for the flash storage system is equal to the predetermined minimum erase rate, the dynamic power and thermal capping mechanism determines whether the rate at which write operations are performed for the flash storage system is greater than a predetermined minimum write rate (step 314). If at step 314 the dynamic power and thermal capping mechanism determines that the rate at which write operations are performed for the flash storage system is greater than a predetermined minimum write rate, the dynamic power and thermal capping mechanism decreases the rate at which write operations are performed for the flash storage system by a predetermined value (step 316), with the operation proceeding to step 312 thereafter.

If at step 314 the dynamic power and thermal capping mechanism determines that the rate at which write operations are performed for the flash storage system is equal to the predetermined minimum write rate, the dynamic power and thermal capping mechanism determines whether the rate at which read operations are performed for the flash storage system is greater than a predetermined minimum read rate (step 318). If at step 318 the dynamic power and thermal capping mechanism determines that the rate at which read operations are performed for the flash storage system is greater than a predetermined minimum read rate, the dynamic power and thermal capping mechanism decreases the rate at which read operations are performed for the flash storage system by a predetermined value (step 320), with the operation proceeding to step 312 thereafter. If at step 318 the dynamic power and thermal capping mechanism determines that the rate at which read operations are performed for the flash storage system is equal to the predetermined minimum read rate, then dynamic power and thermal capping mechanism sends an error to an administrator (step 322) indicating that all dynamic power and thermal capping changes have been made and manual intervention is required. The operation then proceeds to step 312 thereafter.

Returning to step 306, if at this step the dynamic power and thermal capping mechanism determines that the average current ($I_{avg}$) value associated with that flash storage system fails to be greater than a predetermined maximum current. ($I_{max}$) value, the dynamic power and thermal capping mechanism determines whether the power (P or $P_T$) value associated with that flash storage system is greater than a predetermined maximum power ($P_{max}$) value (step 324). If at step 324 the dynamic power and thermal capping mechanism determines that the power (P or $P_T$) value associated with that flash storage system is greater than the predetermined maximum power ($P_{max}$) value, the operation proceeds to step 308.

If at step 324 the dynamic power and thermal capping mechanism determines that the power (P or $P_T$) value associated with that flash storage system fails to be greater than the predetermined maximum power ($P_{max}$) value, the dynamic power and thermal capping mechanism determines a maximum temperature ($Td_{max}$) value of all the temperature (Td) values obtained for the flash storage system (step 326). The dynamic power and thermal capping mechanism determines whether the $Td_{max}$ value is greater than a predetermined maximum temperature ($T_{max}$) value (step 328). If at step 328 the dynamic power and thermal capping mechanism determines that the $Td_{max}$ value is greater than the $T_{max}$ value, the operation proceeds to step 308.

If at step 328 the dynamic power and thermal capping mechanism determines that the $Td_{max}$ value fails to be greater than the $T_{max}$ value, the dynamic power and thermal capping mechanism determines whether the rate at which read operations are performed for the flash storage system is at a maximum read rate (step 330). If at step 330 the dynamic power and thermal capping mechanism determines that the rate at which read operations are performed for the flash storage system is not at the maximum read rate, the dynamic power and thermal capping mechanism increases the rate at which read operations are performed for the flash storage system by a predetermined value (step 332), with the operation proceeding to step 312 thereafter. If at step 330 the dynamic power and thermal capping mechanism determines that the rate at which read operations are performed for the flash storage system is at the maximum read rate, the dynamic power and thermal capping mechanism determines whether the rate at which write operations are performed for the flash storage system is at a maximum write rate (step 334). If at step 334 the dynamic power and thermal capping mechanism determines that the rate at which write operations are performed for the flash storage system is not at the maximum write rate, the dynamic power and thermal capping mechanism increases the rate at which write operations are performed for the flash storage system by a predetermined value (step 336), with the operation proceeding to step 312 thereafter.

If at step 334 the dynamic power and thermal capping mechanism determines that the rate at which write operations are performed for the flash storage system is at the maximum write rate, the dynamic power and thermal capping mechanism determines whether the rate at which erase operations are performed for the flash storage system is at a maximum erase rate (step 338). If at step 338 the dynamic power and thermal capping mechanism determines that the rate at which erase operations are performed for the flash storage system is not at the maximum erase rate, the dynamic power and thermal capping mechanism increases the rate at which erase operations are performed for the flash storage system by a predetermined value (step 340), with the operation proceeding to step 312 thereafter. If at step 338 the dynamic power and thermal capping mechanism determines that the rate at which erase operations are performed for the flash storage system is at the maximum erase rate, the operation proceeds to step 312.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for dynamic power and thermal capping in flash storage systems. The mechanisms provide for dynamic power/performance optimization of the flash storage system using a measurement and feedback system involving power and/or thermal measurements and control of flash knobs to adjust power draw limits dynamically. In the illustrative embodiments, using measured power usage as well as a measured temperature for each portion of the flash storage system, when a power cap and/or temperature cap is reached, the mechanisms dynamically adjusts the erase rate to respond first to power/thermal capping. Therefore, rather than erase operations occurring at a constant rate, the mechanisms control the erase operations scheduling across the flash memory within the flash storage system. If the erase rate has been adjusted such that a minimum erase rate is met, then the mechanism adjust one or more of read rate operations or write rate operations to meet the power budget. In the illustrative embodiments, the rate at which writes are performed are lowered before the rate at which read operations are performed, because write operations utilize more power than read operations, since in write operations the state of one or more bits is actually being changed. However, the lowering of the rate of write operations before read operations may be reordered if write operations are of higher priority over reads without changing the key concepts of the given embodiment.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapter.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamic power and thermal capping in a flash storage system, the method comprising:
   receiving a set of measurement values for the flash storage system, wherein the set of measurement values comprise one or more of a set of current (I) measurement values, a set of voltage (V) measurement values, or a set of temperature (T) measurement values;
   determining an average current ($I_{avg}$) value from the set of current (I) measurement values;
   responsive to the average current ($I_{avg}$) value being greater than a predetermined maximum current ($I_{max}$) value, determining whether a rate at which erase operations are performed for the flash storage system is greater than a predetermined minimum erase rate, wherein the erase operations initialize one or more bits of one or more subcomponents of a set of flash devices in the flash storage system to a first value;
   responsive to the rate at which erase operations are performed for the flash storage system being greater than the predetermined minimum erase rate, decreasing the rate at which erase operations are performed for the flash storage system by a predetermined value;
   responsive to the rate at which erase operations are performed for the flash storage system being equal to the predetermined minimum erase rate, determining whether the rate at which write operations are performed for the flash storage system is greater than a predetermined minimum write rate, wherein the write operations change only specific bits of the one or more subcomponents of the set of flash devices in the flash storage system required to be changed from the first state to a second state and wherein the specific bits is a number of bits less than all of the bits that were initialize in the erase operation for a data block being written to; and
   responsive to the rate at which write operations are performed for the flash storage system being greater than the predetermined minimum write rate, decreasing the rate at which write operations are performed for the flash storage by the predetermined value.

2. The method of claim 1, further comprising:
   responsive to the rate at which write operations are performed for the flash storage system being equal to the predetermined minimum write rate, determining whether a rate at which read operations are performed for the flash storage system is greater than a predetermined minimum read rate;
   responsive to the rate at which read operations are performed for the flash storage system being greater than the predetermined minimum read rate, decreasing the rate at which read operations are performed for the flash storage system by the predetermined value; and
   responsive to the rate at which read operations are performed for the flash storage system being equal to the predetermined minimum read rate, sending an error message.

3. The method of claim 1, further comprising:
   responsive to the average current ($I_{avg}$) value being less than or equal to the predetermined maximum current ($I_{max}$) value, determining an average voltage ($V_{avg}$) value from the set of voltage (V) measurement values;
   calculating a power (P) value for the flash storage system using: $P=V_{avg}*I_{avg}$;
   determining whether the power (P) value is greater than a predetermined maximum power ($P_{max}$) value;
   responsive to the power value (P) value being greater than a predetermined maximum power ($P_{max}$) value, determining whether the rate at which erase operations are performed for the flash storage system is greater than the predetermined minimum erase rate; and
   responsive to the rate at which erase operations are performed for the flash storage system being greater than the predetermined minimum erase rate, decreasing the rate at which erase operations are performed for the flash storage system by a predetermined value.

4. The method of claim 3, further comprising:
   responsive to the power value (P) value being less than or equal to the predetermined maximum power ($P_{max}$) value, determining a maximum temperature ($Td_{max}$) value of a set of temperature (Td) measurement values;
   determining whether $Td_{max}$ is greater than a predetermined maximum temperature ($T_{max}$) value;
   responsive to the $Td_{max}$ value being greater than the $T_{max}$ value, determining whether the rate at which erase operations are performed for the flash storage system is greater than the predetermined minimum erase rate; and
   responsive to the rate at which erase operations are performed for the flash storage system being greater than the predetermined minimum erase rate, decreasing the rate at which erase operations are performed for the flash storage system by a predetermined value.

5. The method of claim 1, further comprising:
   responsive to the average current ($I_{avg}$) value being less than or equal to the predetermined maximum current ($I_{max}$) value, responsive to a power value (P) value being less than or equal to a predetermined maximum power ($P_{max}$) value, and responsive to a maximum temperature ($Td_{max}$) value being less than or equal to a predetermined maximum temperature ($T_{max}$) value, determining whether the rate at which read operations are performed for the flash storage system is at a maximum read rate; and
   responsive to the rate at which read operations are performed for the flash storage system failing to be at the maximum read rate, increasing the rate at which read operations are performed for the flash storage system by the predetermined value.

6. The method of claim 5, further comprising:
   responsive to the rate at which read operations are performed for the flash storage system being at the maximum read rate, determining whether the rate at which write operations are performed for the flash storage system is at a maximum write rate; and
   responsive to the rate at which write operations are performed for the flash storage system failing to be at the maximum write rate, increasing the rate at which write operations are performed for the flash storage system by the predetermined value.

7. The method of claim 6, further comprising:
responsive to the rate at which write operations are performed for the flash storage system being at the maximum write rate, determining whether the rate at which erase operations are performed for the flash storage system is at a maximum erase rate; and
responsive to the rate at which erase operations are performed for the flash storage system failing to be at the maximum erase rate, increasing the rate at which erase operations are performed for the flash storage system by the predetermined value.

8. The method of claim 1, wherein the rate at which operations are performed for the flash storage system are controlled via a flash controller and wherein the flash controller achieves rate adjustments for these operations by receiving frequency or voltage scaling controls thereby allowing for improved operations per watt when the maximum rates of operations are not currently selected.

9. The method of claim 8, wherein the erase operations are for a set of data blocks identified by at least one of a garbage collection process, a defragmentation process, or a primary initialization process.

10. A computer program product comprising a non-transitory computer readable storage medium having a computer readable program stored therein, wherein the computer readable program, when executed on a computing device, causes the computing device to:
receive a set measurement values, for a flash storage system, wherein the set of measurement values comprise one or more of a set of current (I) measurement values, a set of voltage (V) measurement values, or a set of temperature (T) measurement values;
determine an average current ($I_{avg}$) from the set of current (I) measurement values;
responsive to the average current ($I_{avg}$) value being greater than a predetermined maximum current ($I_{max}$) value, determine whether a rate at which erase operations are performed for the flash storage system is greater than a predetermined minimum erase rate, wherein the erase operations initialize one or more bits of one or more subcomponents of a set of flash devices in the flash storage system to a first value;
responsive to the rate at which erase operations are performed for the flash storage system being greater than the predetermined minimum erase rate, decrease the rate at which erase operations are performed for the flash storage system by a predetermined value;
responsive to the rate at which erase operations are performed for the flash storage system being equal to the predetermined minimum erase rate, determine whether the rate at which write operations are performed for the flash storage system is greater than a predetermined minimum write rate, wherein the write operations change only specific bits of the one or more subcomponents of the set of flash devices in the flash storage system required to be changed from the first state to a second state and wherein the specific bits is a number of bits less than all of the bits that were initialized in the erase operation for a data block being written to; and
responsive to the rate at which write operations are performed for the flash storage system being greater than the predetermined minimum write rate, decrease the rate at which write operations are performed for the flash storage system by the predetermined value.

11. The computer program product of claim 10, wherein the computer readable program further causes the computing device to:
responsive to the rate at which write operations are performed for the flash storage system being equal to the predetermined minimum write rate, determine whether a rate at which read operations are performed for the flash storage system is greater than a predetermined minimum read rate;
responsive to the rate at which read operations are performed for the flash storage system being greater than the predetermined minimum read rate, decrease the rate at which read operations are performed for the flash storage system by the predetermined value; and
responsive to the rate at which read operations are performed for the flash storage system being equal to the predetermined minimum read rate, send an error message.

12. The computer program product of claim 10, wherein the computer readable program further causes the computing device to:
responsive to the average current ($I_{avg}$) value being less than or equal to the predetermined maximum current ($I_{max}$) value, determine an average voltage ($V_{avg}$) value from the set of voltage (V) measurement values;
calculate a power (P) value for the flash storage system using: $P = V_{avg} * I_{avg}$;
determine whether the power (P) value is greater than a predetermined maximum power ($P_{max}$) value;
responsive to the power value (P) value being greater than a predetermined maximum power ($P_{max}$) value, determine whether the rate at which erase operations are performed for the flash storage system is greater than the predetermined minimum erase rate; and
responsive to the rate at which erase operations are performed for the flash storage system being greater than the predetermined minimum erase rate, decrease the rate at which erase operations are performed for the flash storage system by a predetermined value.

13. The computer program product of claim 12, wherein the computer readable program further causes the computing device to:
responsive to the power value (P) value being less than or equal to the predetermined maximum power ($P_{max}$) value, determine a maximum temperature ($Td_{max}$) value of a set of temperature (Td) measurement values;
determine whether $Td_{max}$ is greater than a predetermined maximum temperature ($T_{max}$) value;
responsive to the $Td_{max}$ value being greater than the $T_{max}$ value, determine whether the rate at which erase operations are performed for the flash storage system is greater than the predetermined minimum erase rate; and
responsive to the rate at which erase operations are performed for the flash storage system being greater than the predetermined minimum erase rate, decrease the rate at which erase operations are performed for the flash storage system by a predetermined value.

14. An apparatus comprising:
a processor; and
a memory coupled to the processor, wherein the memory comprises instructions which, when executed by the processor, cause the processor to:
receive a set of measurement values, for a flash storage system, wherein the set of measurement values comprise one or more of a set of current (I) measurement values, a set of voltage (V) measurement values, or a set of temperature (T) measurement values;

determine an average current ($I_{avg}$) value from the set of current (I) measurement values;

responsive to the average current ($I_{avg}$) value being greater than a predetermined maximum current ($I_{max}$) value, determine whether a rate at which erase operations are performed for the flash storage system is greater than a predetermined minimum erase rate, wherein the erase operations initialize one or more bits of one or more subcomponents of a set of flash devices in the flash storage system to a first value;

responsive to the rate at which erase operations are performed for the flash storage system being greater than the predetermined minimum erase rate, decrease the rate at which erase operations are performed for the flash storage system by a predetermined value;

responsive to the rate at which erase operations are performed for the flash storage system being equal to the predetermined minimum erase rate, determine whether the rate at which write operations are performed for the flash storage system is greater than a predetermined minimum write rate, wherein the write operations change only specific bits of the one or more subcomponents of the set of flash devices in the flash storage system required to be changed from the first state to a second state and wherein the specific bits is a number of bits less than all of the bits that were initialized in the erase operation for a data block being written to; and responsive to the rate at which write operations are performed for the flash storage system being greater than the predetermined minimum write rate, decrease the rate at which write operations are performed for the flash storage system by the predetermined value.

15. The apparatus of claim 14, wherein the instructions further cause the processor to:

responsive to the rate at which write operations are performed for the flash storage system being equal to the predetermined minimum write rate, determine whether a rate at which read operations are performed for the flash storage system is greater than a predetermined minimum read rate;

responsive to the rate at which read operations are performed for the flash storage system being greater than the predetermined minimum read rate, decrease the rate at which read operations are performed for the flash storage system by the predetermined value; and responsive to the rate at which read operations are performed for the flash storage system being equal to the predetermined minimum read rate, send an error message.

16. The apparatus of claim 14, wherein the instructions further cause the processor to:

responsive to the average current ($I_{avg}$) value being less than or equal to the predetermined maximum current ($I_{max}$) value, determine an average voltage ($V_{avg}$) value from the set of voltage (V) measurement values;

calculate a power (P) value for the flash storage system using: $P=V_{avg}*I_{avg}$;

determine whether the power (P) value is greater than a predetermined maximum power ($P_{max}$) value;

responsive to the power value (P) being greater than a predetermined maximum power ($P_{max}$) value, determine whether the rate at which erase operations are performed for the flash storage system is greater than the predetermined minimum erase rate; and responsive to the rate at which erase operations are performed for the flash storage system being greater than the predetermined minimum erase rate, decrease the rate at which erase operations are performed for the flash storage system by a predetermined value.

17. The apparatus of claim 16, wherein the instructions further cause the processor to:

responsive to the power value (P) value being less than or equal to the predetermined maximum power ($P_{max}$) value, determine a maximum temperature ($Td_{max}$) value of a set of temperature (Td) measurement values;

determine whether $Td_{max}$ is greater than a predetermined maximum temperature ($T_{max}$) value;

responsive to the $Td_{max}$ value being greater than the $T_{max}$ value, determine whether the rate at which erase operations are performed for the flash storage system is greater than the predetermined minimum erase rate; and responsive to the rate at which erase operations are performed for the flash storage system being greater than the predetermined minimum erase rate, decrease the rate at which erase operations are performed for the flash storage system by a predetermined value.

* * * * *